(No Model.)

E. L. RANSOME.
ELECTRIC CONDUIT.

No. 490,630. Patented Jan. 24, 1893.

Witnesses
Geo. K. Kelley
T. J. Thompson

Inventor
Ernest Leslie Ransome

UNITED STATES PATENT OFFICE.

ERNEST LESLIE RANSOME, OF OAKLAND, CALIFORNIA.

ELECTRIC CONDUIT.

SPECIFICATION forming part of Letters Patent No. 490,630, dated January 24, 1893.

Application filed April 5, 1892. Serial No. 427,932. (No model.)

*To all whom it may concern:*

Be it known that I, ERNEST LESLIE RANSOME, a citizen of the United States, residing at Oakland, in the county of Alameda and State of California, have invented new and useful Improvements in Conduits, of which the following is a specification.

Figure 1:
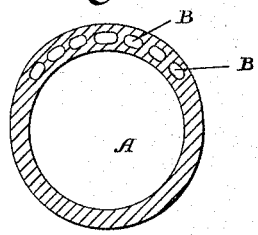
Figure 2:
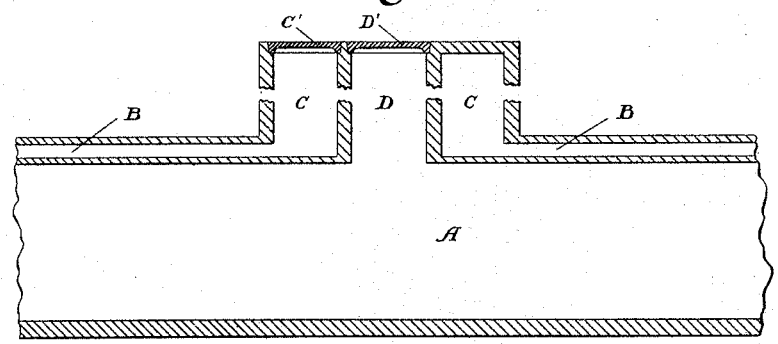
Figure 3:
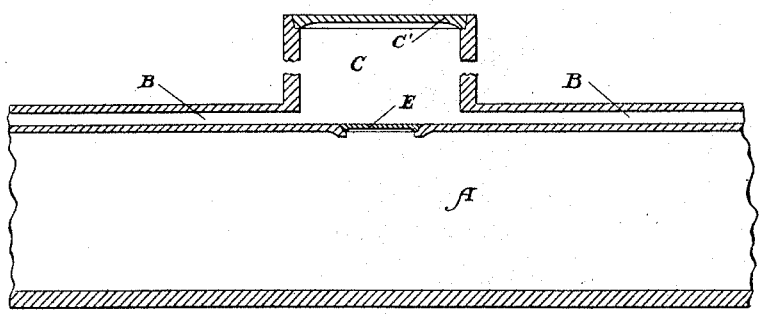

My invention relates to improvements in the construction of conduits, and the object of my improvements is to so construct sewer, water or gas pipes that they may not only be applicable to their several purposes, but also for carrying electric wires. I attain this object by making the pipe in the manner illustrated in the accompanying drawings in which:

Figure 1 is a vertical section of the conduit. Figs. 2 and 3 are longitudinal sections of the manholes connected therewith.

The conduit consists of the sewer, water or gas pipe, or mainway A, and the electric tubes or ways B, and may be made with as many of each and of such shape as desired.

Hitherto, in the construction of electric subways, the expense has been large, consisting as it does of the cost of taking up and relaying the street pavement, excavating trenches and refilling, together with the cost of the conduit. Whereas, by constructing them within the walls of other conduits, according to my invention, the cost is very largely reduced.

I form the manholes to the electric ways in any of the usual ways, or I form them larger and carry down by or through them the walls of an independent manhole to the mainway, as illustrated by Fig. 2, where C represents the electric manhole, with entrance at C', and the manhole to the mainway, having entrance at D'. The wires of the electric ways being carried round past the walls of the mainway manhole, or these latter walls may be omitted and the entrance to the mainway be made through the floor of the electric manhole, as illustrated by Fig. 3 at E. These conduits or ways may be made of any suitable material, such as concrete, earthen-ware, brick, iron or wood, and either placed in the required position or built *in situ.*

What I claim and desire to secure by Letters Patent of the United States is:

1. A water conduit with passages for electric conductors formed in the walls thereof, in combination with a manhole and entrance chamber common to all, substantially as described.

2. A water conduit with passages for electric conductors formed in the walls thereof in combination with double entrance chambers, the one leading to the water conduit, and the other leading to the passages for electric conductors, substantially as described.

ERNEST LESLIE RANSOME.

Witnesses:
GEO. J. KELLEY,
F. J. THOMPSON.